(12) United States Patent
Mo et al.

(10) Patent No.: US 11,462,766 B2
(45) Date of Patent: Oct. 4, 2022

(54) LIALC14 DERIVATIVES IN THE SPACE GROUP OF PNMA AS LI SUPER-IONIC CONDUCTOR, SOLID ELECTROLYTE, AND COATING LAYER FOR LI METAL BATTERY AND LI-ION BATTERY

(71) Applicants: TOYOTA MOTOR ENGINEERING & MANUFACTURING NORTH AMERICA, INC., Plano, TX (US); UNIVERSITY OF MARYLAND, COLLEGE PARK, College Park, MD (US)

(72) Inventors: Yifei Mo, Fulton, MD (US); Yunsheng Liu, Hyattsville, MD (US); Xingfeng He, Greenbelt, MD (US); Chen Ling, Troy, MI (US)

(73) Assignees: TOYOTA MOTOR ENGINEERING & MANUFACTURING NORTH AMERICA, INC., Plano, TX (US); UNIVERSITY OF MARYLAND, COLLEGE PARK, College Park, MD (US)

( * ) Notice: Subject to any disclaimer, the term of this patent is extended or adjusted under 35 U.S.C. 154(b) by 276 days.

(21) Appl. No.: 16/909,809

(22) Filed: Jun. 23, 2020

(65) Prior Publication Data
US 2021/0399335 A1    Dec. 23, 2021

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
None
See application file for complete search history.

(56) References Cited

U.S. PATENT DOCUMENTS

| 9,595,736 B2 | 3/2017 | Homma et al. |
| 2012/0189910 A1 | 7/2012 | Brune et al. |
| 2013/0266878 A1 | 10/2013 | Vajo et al. |
| 2016/0308245 A1 | 10/2016 | Xu et al. |
| 2016/0315347 A1 | 10/2016 | Li et al. |

(Continued)

FOREIGN PATENT DOCUMENTS

| CN | 105680090 B | 1/2018 |
| EP | 0 861 804 A1 | 9/1998 |

(Continued)

*Primary Examiner* — Christopher P Domone
(74) *Attorney, Agent, or Firm* — Oblon, McClelland, Maier & Neustadt, L.L.P.

(57) ABSTRACT

Solid-state lithium ion electrolytes of lithium aluminum chloride derivative compounds having a crystal morphology in the Pnma space group are provided as materials for conducting lithium ions. An activation energy of the lithium aluminum chloride derivative compounds is from 0.2 to 0.45 eV and conductivities are from 0.01 to 10 mS/cm at 300K. Compounds of specific formulae are provided and methods to alter the materials with inclusion of aliovalent ions shown. Lithium batteries containing the composite lithium ion electrolytes and electrodes containing the lithium aluminum chloride derivative compounds are also provided.

9 Claims, 9 Drawing Sheets
(5 of 9 Drawing Sheet(s) Filed in Color)

(56) References Cited

U.S. PATENT DOCUMENTS

2019/0123384 A1* 4/2019 Harry .................. H01M 50/443
2019/0214650 A1   7/2019 Sakamoto et al.
2020/0020895 A1   1/2020 Collins et al.
2021/0408586 A1* 12/2021 Ueno ....................... H01B 1/06

FOREIGN PATENT DOCUMENTS

JP         5949124 B2    7/2016
WO    WO 2018/025582    2/2018

* cited by examiner

| Peak Position | Relative Intensity |
|---|---|
| 15.8287 | 18.47 |
| 15.8412 | 19.40 |
| 17.5170 | 48.57 |
| 17.6141 | 41.81 |
| 18.2300 | 17.86 |
| 18.3236 | 15.33 |
| 22.6760 | 13.43 |
| 26.3747 | 48.78 |
| 26.5063 | 43.90 |
| 27.0275 | 39.54 |
| 28.8947 | 100.0 |
| 30.0765 | 50.07 |
| 30.2067 | 55.72 |
| 30.2070 | 50.77 |
| 30.3098 | 55.40 |
| 30.7076 | 58.42 |
| 30.7342 | 58.40 |
| 39.4155 | 12.77 |
| 39.5291 | 10.18 |
| 39.6216 | 12.25 |
| 39.6921 | 10.90 |
| 46.3067 | 32.52 |
| 47.2729 | 26.01 |
| 47.5117 | 27.20 |
| 51.8647 | 16.02 |
| 51.9651 | 17.17 |
| 52.1143 | 16.45 |
| 52.1627 | 17.26 |
| 52.3352 | 15.62 |
| 52.3867 | 15.41 |

Fig. 3

| Peak Position | Relative Intensity |
|---|---|
| 8.93568 | 11.60 |
| 13.59639 | 32.55 |
| 15.99040 | 33.39 |
| 16.00328 | 30.13 |
| 17.92628 | 72.29 |
| 17.92634 | 82.81 |
| 18.56683 | 27.63 |
| 18.63602 | 25.98 |
| 19.89451 | 13.28 |
| 19.91537 | 16.03 |
| 23.37764 | 34.29 |
| 27.14112 | 69.98 |
| 27.14120 | 69.56 |
| 27.38906 | 75.95 |
| 27.74956 | 12.86 |
| 27.77237 | 13.66 |
| 27.79687 | 11.93 |
| 27.81976 | 14.14 |
| 28.40555 | 11.67 |
| 28.49817 | 11.11 |
| 29.17536 | 100.00 |
| 30.83856 | 60.12 |
| 30.85233 | 63.28 |
| 30.92449 | 61.53 |
| 30.93837 | 61.92 |
| 31.09523 | 71.41 |
| 31.12272 | 61.27 |
| 32.21537 | 11.98 |
| 32.22867 | 13.86 |
| 32.31136 | 15.95 |
| 35.91468 | 10.26 |
| 40.18978 | 11.06 |
| 40.21173 | 16.46 |
| 40.32634 | 10.83 |
| 40.34833 | 16.20 |
| 40.42258 | 12.10 |
| 47.80638 | 61.71 |
| 48.26451 | 57.89 |
| 48.26466 | 56.12 |
| 52.71557 | 32.24 |
| 52.74223 | 29.86 |
| 52.88172 | 32.26 |
| 52.90848 | 29.06 |
| 52.92776 | 28.07 |
| 52.98114 | 29.70 |

Fig. 6

| Peak Position | Relative Intensity |
|---|---|
| 5.860 | 17.51 |
| 6.791 | 13.26 |
| 8.973 | 11.61 |
| 13.605 | 38.87 |
| 15.926 | 53.58 |
| 15.970 | 40.64 |
| 18.001 | 94.37 |
| 18.007 | 100.0 |
| 18.607 | 37.57 |
| 18.646 | 27.65 |
| 19.835 | 22.31 |
| 19.881 | 10.63 |
| 19.906 | 14.99 |
| 23.597 | 48.7 |
| 27.333 | 73.68 |
| 27.341 | 74.15 |
| 27.407 | 83.09 |
| 27.756 | 18.70 |
| 27.789 | 17.75 |
| 27.840 | 21.31 |
| 27.861 | 19.83 |
| 28.570 | 17.61 |
| 28.599 | 15.53 |
| 28.626 | 15.52 |
| 28.648 | 13.96 |
| 29.061 | 85.31 |
| 29.854 | 13.45 |
| 30.984 | 50.45 |
| 31.038 | 56.98 |

| Peak Position | Relative Intensity |
|---|---|
| 31.040 | 51.64 |
| 31.051 | 66.77 |
| 31.080 | 62.22 |
| 31.145 | 55.64 |
| 32.154 | 16.58 |
| 32.201 | 22.78 |
| 32.203 | 16.18 |
| 32.247 | 20.71 |
| 35.748 | 15.17 |
| 35.871 | 13.84 |
| 37.568 | 10.37 |
| 40.297 | 13.24 |
| 40.323 | 18.38 |
| 40.395 | 17.48 |
| 48.277 | 69.01 |
| 48.399 | 65.39 |
| 48.413 | 64.67 |
| 52.673 | 36.07 |
| 52.717 | 30.22 |
| 52.768 | 32.24 |
| 52.772 | 36.81 |
| 52.858 | 33.37 |
| 52.899 | 34.82 |
| 74.318 | 11.42 |
| 74.339 | 10.59 |
| 74.481 | 11.53 |
| 74.618 | 10.30 |

LIALC14 DERIVATIVES IN THE SPACE GROUP OF PNMA AS LI SUPER-IONIC CONDUCTOR, SOLID ELECTROLYTE, AND COATING LAYER FOR LI METAL BATTERY AND LI-ION BATTERY

THE NAMES OF THE PARTIES TO A JOINT RESEARCH AGREEMENT

The disclosure herein is a result of joint research effort conducted under a joint research agreement between TOYOTA MOTOR ENGINEERING & MANUFACTURING NORTH AMERICA, INC. having an address of 6565 Headquarters Drive W1-3C, Plano, Tex., 75024, and UNIVERSITY OF MARYLAND, COLLEGE PARK having an address of 2130 Mitchell Bldg. 7999 Regents Dr. College Park, Md., 20742.

FIELD OF DISCLOSURE

This disclosure is directed to novel $LiAlCl_4$ derivative compounds of high lithium ion conductivity having a crystal structure of the Pnma space group which are useful as solid electrolytes and electrode components and/or electrode coatings for Li ion and Li metal batteries.

BACKGROUND

Li-ion batteries have traditionally dominated the market of portable electronic devices. However, conventional Li-ion batteries contain flammable organic solvents as components of the electrolyte and this flammability is the basis of a safety risk which is of concern and could limit or prevent the use of Li-ion batteries for application in large scale energy storage.

Replacing the flammable organic liquid electrolyte with a solid Li-conductive phase would alleviate this safety issue, and may provide additional advantages such as improved mechanical and thermal stability. A primary function of the solid Li-conductive phase, usually called solid Li-ion conductor or solid state electrolyte, is to conduct $Li^+$ ions from the anode side to the cathode side during discharge and from the cathode side to the anode side during charge while blocking the direct transport of electrons between electrodes within the battery.

Moreover, lithium batteries constructed with nonaqueous electrolytes are known to form dendritic lithium metal structures projecting from the anode to the cathode over repeated discharge and charge cycles. If and when such a dendrite structure projects to the cathode and shorts the battery energy is rapidly released and may initiate ignition of the organic solvent.

Therefore, there is much interest and effort focused on the discovery of new solid Li-ion conducting materials which would lead to an all solid state lithium battery. Studies in the past decades have focused mainly on ionically conducting oxides such as for example, LISICON ($Li_{14}ZnGe_4O_{16}$), NASICON($Li_{1.3}Al_{0.3}Ti_{1.7}(PO_4)_3$), perovskite (for example, $La_{0.5}Li_{0.5}TiO_3$), garnet ($Li_7La_3Zr_2O_{12}$), LiPON (for example, $Li_{2.88}PO_{3.73}N_{0.14}$) and sulfides, such as, for example, $Li_3PS_4$, $Li_7P_3S_{11}$ and LGPS ($Li_{10}GeP_2S_{12}$).

While recent developments have marked the conductivity of solid Li-ion conductor to the level of 1-10 mS/cm, which is comparable to that in liquid phase electrolyte, finding new Li-ion solid state conductors is of great interest.

An effective lithium ion solid-state conductor will have a high $Li^+$ conductivity at room temperature. Generally, the $Li^+$ conductivity should be no less than $10^{-6}$ S/cm. Further, the activation energy of $Li^+$ migration in the conductor must be low for use over a range of operation temperatures that might be encountered in the environment. Additionally, the material should have good stability against chemical, electrochemical and thermal degradation. Unlike many conventionally employed non-aqueous solvents, the solid-state conductor material should be stable to electrochemical degradation reactivity with the anode and cathode chemical composition. The material should have low grain boundary resistance for usage in an all solid-state battery. Ideally, the synthesis of the material should be easy and the cost should not be high.

The standard redox potential of Li/Li+ is −3.04 V, making lithium metal one of the strongest reducing agents available. Consequently, Li metal can reduce most known cationic species to a lower oxidation state. Because of this strong reducing capability when the lithium metal of an anode contacts a solid-state $Li^+$ conductor containing cation components different from lithium ion, the lithium reduces the cation specie to a lower oxidation state and deteriorates the solid-state conductor.

Thus, many current conventionally known solid Li-ion conductors suffer a stability issue when in contact with a Li metal anode.

The inventors of this application have been studying lithium compounds which may serve for future use of solid-state Li+ conductors and previous results of this study are disclosed in U.S. application Ser. No. 15/626,696, filed Jun. 19, 2017, U.S. Ser. No. 15/805,672, filed Nov. 7, 2017, U.S. application Ser. No. 16/013,495, filed Jun. 20, 2018, U.S. application Ser. No. 16/114,946 filed Aug. 28, 2018, U.S. application Ser. No. 16/142,217 filed Sep. 26, 2018, U.S. application Ser. No. 16/144,157 filed Sep. 27, 2018, U.S. application Ser. No. 16/153,335 filed Oct. 10, 2018, U.S. application Ser. No. 16/155,349 filed Oct. 9, 2018, U.S. application Ser. No. 16/264,294, filed Jan. 31, 2019. U.S. application Ser. No. 16/570,811, filed Sep. 13, 2019, and U.S. application Ser. No. 16/570,888, filed Sep. 13, 2019. However, research effort continues to discover additional materials having maximum efficiency, high stability, low cost and ease of handling and manufacture.

Accordingly, an object of this application is to identify a range of further materials having high Li ion conductivity while being poor electron conductors which are suitable as a solid state electrolytes and/or electrode components for lithium ion and lithium metal battery.

A further object of this application is to provide a solid state lithium ion and/or lithium metal batteries containing these materials having high Li ion conductivity while being poor electron conductors.

SUMMARY OF THE EMBODIMENTS

These and other objects are provided by the embodiments of the present application, the first embodiment of which includes a solid-state lithium ion electrolyte, comprising: at least one material selected from the group of materials consisting of compounds of formulae (I), (II), (III) and (IV):

$$Li_{x-y}(M1)_y AlCl_4 \qquad (I)$$

wherein y is a number from greater than 0 to less than 1, x is a value such that charge neutrality of the formula is obtained, and M1 is at least one element different from Li selected from elements of groups 1, 2 and 13;

$$Li_x Al_{1-z}(M2)_z Cl_4 \qquad (II)$$

wherein z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and $$Li_xAlCl_{4-h}(X)_h \quad (III)$$

wherein h is from greater than 0 to less than 4, x is a value such that the formula (III) is charge neutral, and X is at least one element different from Cl selected from elements of groups 16 and 17; and $$Li_{x-m}(M1)_mAl_{1-n}(M2)_nCl_{4-o}(X)_o \quad (IV)$$

wherein m is a number from 0 to less than 1, n is a number from 0 to less than 1, o is a number from 0 to less than 4 and x is a value such that formula (IV) is charge neutral, with the proviso that at least two of m, n and o cannot be 0, wherein the compounds of formulae (I), (II), (III) and (IV) comprise a crystal lattice structure having an orthorhombic phase of the space group Pnma, and with the proviso that the content of M1, M2 and/or X is a value such that the Pnma structure of the compound is maintained.

In an aspect of the first embodiment a lithium ion (Li$^+$) conductivity of the solid state lithium ion electrolyte of formulae (I) to (IV) is from 0.1 to 10 S/cm at 300K.

In another aspect of the first embodiment an activation energy of the composite of formulae (I) to (IV) is from 0.2 to 0.45 eV.

In a second embodiment, a solid-state lithium battery is provided. The battery comprises:
an anode;
a cathode; and
a solid state lithium ion electrolyte located between the anode and the cathode;
wherein
the solid state lithium ion electrolyte comprises at least one material selected from the group of materials consisting compounds of formulae (I), (II), (III) and (IV):

$$Li_{x-y}(M1)_yAlCl_4 \quad (I)$$

wherein y is a number from greater than 0 to less than 1, x is a value such that charge neutrality of the formula is obtained, and M1 is at least one element different from Li selected from elements of groups 1, 2 and 13;

$$Li_xAl_{1-z}(M2)_zCl_4 \quad (II)$$

wherein z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and $$Li_xAlCl_{4-h}(X)_h \quad (III)$$

wherein h is from greater than 0 to less than 4, x is a value such that the formula (III) is charge neutral, and X is at least one element different from Cl selected from elements of groups 16 and 17; and $$Li_{x-m}(M1)_mAl_{1-n}(M2)_nCl_{4-o}(X)_o \quad (IV)$$

wherein m is a number from 0 to less than 1, n is a number from 0 to less than 1, o is a number from 0 to less than 4 and x is a value such that formula (IV) is charge neutral, with the proviso that at least two of m, n and o cannot be 0, wherein the compounds of formulae (I), (II), (III) and (IV) comprise a crystal lattice structure having an orthorhombic phase of the space group Pnma, and with the proviso that the content of M1, M2 and/or X is a value such that the Pnma structure of the compound is maintained.

The lithium battery of the second embodiment may be a lithium metal battery or a lithium ion battery.

In a third embodiment, an electrode for a solid state lithium battery is provided. The electrode comprises:
a current collector; and
an electrode active layer on the current collector;
wherein the electrode active layer comprises at least one compound selected from the group consisting of compounds of formulae (I), (II), (III) and (IV):

$$Li_{x-y}(M1)_yAlCl_4 \quad (I)$$

wherein y is a number from greater than 0 to less than 1, x is a value such that charge neutrality of the formula is obtained, and M1 is at least one element different from Li selected from elements of groups 1, 2 and 13;

$$Li_xAl_{1-z}(M2)_zCl_4 \quad (II)$$

wherein z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and $$Li_xAlCl_{4-h}(X)_h \quad (III)$$

wherein h is from greater than 0 to less than 4, x is a value such that the formula (III) is charge neutral, and X is at least one element different from Cl selected from elements of groups 16 and 17; and $$Li_{x-m}(M1)_mAl_{1-n}(M2)_nCl_{4-o}(X)_o \quad (IV)$$

wherein m is a number from 0 to less than 1, n is a number from 0 to less than 1, o is a number from 0 to less than 4 and x is a value such that formula (IV) is charge neutral, with the proviso that at least two of m, n and o cannot be 0, wherein the compounds of formulae (I), (II), (III) and (IV) comprise a crystal lattice structure having an orthorhombic phase of the space group Pnma, and with the proviso that the content of M1, M2 and/or X is a value such that the Pnma structure of the compound is maintained.

In a fourth embodiment, an electrode for a solid state lithium battery is provided. The electrode comprises:
a current collector;
an electrode active layer on the current collector; and a coating layer on the electrode active layer;
wherein the coating layer on the electrode active layer comprises at least one compound selected from the group consisting of compounds of formulae (I), (II), (III) and (IV):

$$Li_{x-y}(M1)_yAlCl_4 \quad (I)$$

wherein y is a number from greater than 0 to less than 1, x is a value such that charge neutrality of the formula is obtained, and M1 is at least one element different from Li selected from elements of groups 1, 2 and 13;

$$Li_xAl_{1-z}(M2)_zCl_4 \quad (II)$$

wherein z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and $$Li_xAlCl_{4-h}(X)_h \quad (III)$$

wherein h is from greater than 0 to less than 4, x is a value such that the formula (III) is charge neutral, and X is at least one element different from Cl selected from elements of groups 16 and 17; and $$Li_{x-m}(M1)_mAl_{1-n}(M2)_nCl_{4-o}(X)_o \quad (IV)$$

wherein m is a number from 0 to less than 1, n is a number from 0 to less than 1, o is a number from 0 to less than 4 and x is a value such that formula (IV) is charge neutral, with the proviso that at least two of m, n and o cannot be 0, wherein the compounds of formulae (I), (II), (III) and (IV) comprise a crystal lattice structure having an orthorhombic phase of the space group Pnma, and with the proviso that the content of M1, M2 and/or X is a value such that the Pnma structure of the compound is maintained.

Solid state lithium batteries containing the electrodes and/or electrolytes of the various embodiments and aspects thereof are also provided. The solid state lithium battery may be a lithium metal battery or a lithium ion battery.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows a table listing the peak positions and intensity for peaks of relative intensity of 1 or greater compared to the peak of greatest intensity in the XRD analysis of $LiAlCl_4$ in FIG. 2.

FIG. 6 shows a table listing the peak positions and intensity for peaks of relative intensity of 1 or greater compared to the peak of greatest intensity in the XRD analysis of $Li_{0.5}Zn_{0.5}Al_{0.5}Cl_4$ in FIG. 5.

FIG. 9 shows a table listing the peak positions and intensity for peaks of relative intensity of 1 or greater compared to the peak of greatest intensity in the XRD analysis of $Li_{1.75}Zn_{0.75}Al_{0.25}Cl_4$ in FIG. 8.

DESCRIPTION OF THE PREFERRED EMBODIMENTS

Figure 1:
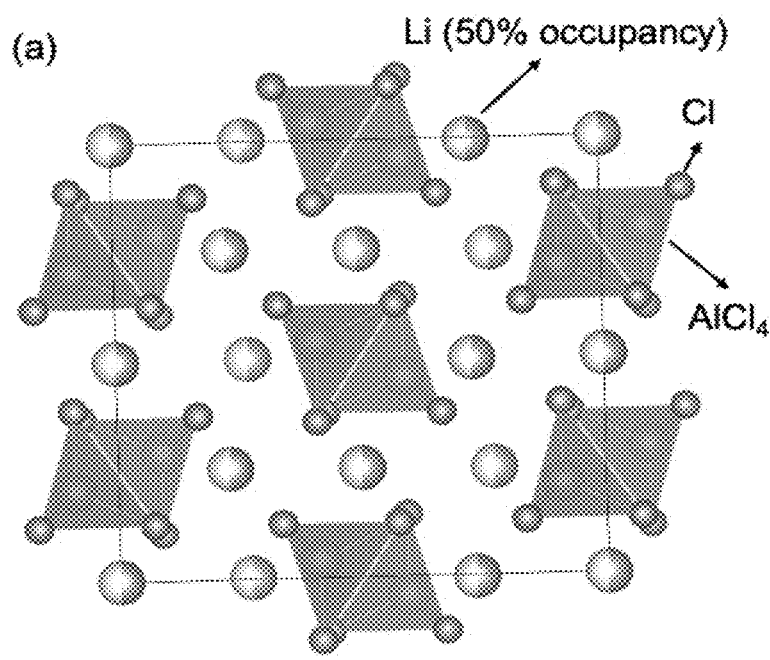
FIG. 1 shows the crystal structure of $LiAlCl_4$.

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently.

Structural characteristics of effective $Li^+$ conducting crystal lattices have been described by Ceder et al. (Nature Materials, 14, 2015, 1026-1031) in regard to known $Li^+$ ion conductors $Li_{10}GeP_2S_{12}$ and $Li_7P_3S_{11}$, where the sulfur sublattice of both materials was shown to very closely match a bcc lattice structure. Further, $Li^+$ ion hopping across adjacent tetrahedral coordinated $Li^+$ lattice sites was indicated to offer a path of lowest activation energy.

The inventors are conducting ongoing investigations of new lithium composite compounds in order to identify materials having the properties which may serve as solid-state electrolytes in solid state lithium batteries. In the course of this ongoing study and effort the inventors have developed and implemented a methodology to identify composite materials which have chemical and structural properties which have been determined by the inventors as indicators of lithium ion conductance suitable to be a solid state electrolyte for a lithium-ion battery and components of an electrode adjacent to the solid state electrolyte.

To qualify as solid state electrolyte in practical applications, the material must meet several certain criteria. First, it should exhibit desirable Li-ion conductivity, usually no less than $10^{-6}$ S/cm at room temperature. Second, the material should have good stability against chemical, electrochemical and thermal degradation. Third, the material should have low grain boundary resistance for usage in all solid-state battery. Fourth, the synthesis of the material should be easy and the cost should not be high.

A criterion of this methodology requires that to qualify as solid state electrolyte in practical application, the material must exhibit desirable Li-ion conductivity, usually no less than $10^{-6}$ S/cm at room temperature. Thus, ab initio molecular dynamics simulation studies were applied to calculate the diffusivity of Li ion in the lattice structures of selected silicate materials. In order to accelerate the simulation, the calculation was performed at high temperatures and the effect of excess Li or Li vacancy was considered. In order to create excess Li or Li vacancy, aliovalent replacement of cation or anions may be evaluated. Thus, Li vacancy was created by, for example, partially substituting Si with aliovalent cationic species while compensating the charge neutrality with Li vacancy or excess Li. For example, replacing 50% of Si in $Li_{10}Si_2PbO_{10}$ with P results in the formation of $Li_9PSiPbO_{10}$.

The diffusivity at 300 K was determined according to equation (I)

$$D = D_0 \exp(-E_a/k_b T) \quad \text{equation (I)}$$

where $D_0$, $E_a$ and $k_b$ are the pre-exponential factor, activation energy and Boltzmann constant, respectively. The conductivity is related with the calculated diffusivity according to equation (II):

$$\sigma = D_{300} \rho e^2 / k_b T \quad \text{equation (II)}$$

where $\rho$ is the volumetric density of Li ion and e is the unit charge.

The anionic lattice of Li-ion conductors has been shown to match certain lattice types (see Nature Materials, 14, 2015, 2016). Therefore, in the anionic lattice of the potential Li$^+$ ion conductor is compared to the anionic lattice of Li$^+$ ion conductor known to have high conductivity.

Thus, selected lithium aluminum chloride derivative compounds were compared to Li-containing compounds reported in the inorganic crystal structure database (FIZ Karlsruhe ICSD—https://icsd.fiz-karlsruhe.de) and evaluated in comparison according to an anionic lattice matching method developed by the inventors for this purpose and described in copending U.S. application Ser. No. 15/597,651, filed May 17, 2017, to match the lattice of these compounds to known Li-ion conductors.

According to the anionic lattice matching method described in copending U.S. application Ser. No. 15/597,651, an atomic coordinate set for the compound lattice structure may be converted to a coordinate set for only the anion lattice. The anions of the lattice are substituted with the anion of the comparison material and the obtained unit cell rescaled. The x-ray diffraction data for modified anion-only lattice may be simulated and an n×2 matrix generated from the simulated diffraction data. Quantitative structural similarity values can be derived from the n×2 matrices.

The purpose of anionic lattice matching is to further identify compounds with greatest potential to exhibit high Li$^+$ conductivity. From this work, the compounds described in the embodiments which follow were determined to be potentially suitable as a solid-state Li' conductors.

Figure 11:
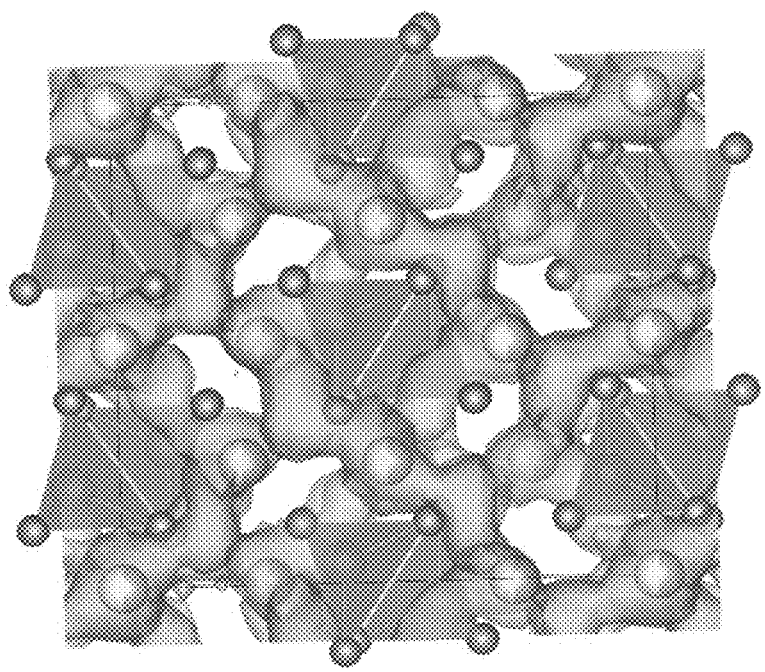
FIG. 11 shows the Li-ion probability density in $LiAlCl_4$ obtained from AIMD simulations.

Ab initio molecular dynamics (AIMD) simulation was then applied to predict the conductivity of the targeted lithium aluminum chloride derivative compounds. The initial structures were statically relaxed and were set to an initial temperature of 100 K. The structures were then heated to targeted temperatures (550-650 K) at a constant rate by velocity scaling over a time period of 2 ps. The total time of AIMD simulations were in the range of 400 to 1000 ps. A typical example of the calculated diffusivity as a function of temperature is shown in FIG. 11. The Li$^+$ diffusivity at different temperatures from 500-650 K follows an Arrhenius-type relationship.

Applying equation (I) above the diffusivity at 300 K was determined and then the conductivity may be determined using the link between conductivity and diffusivity of equation (II).

Accordingly, the first embodiment provides a solid-state lithium ion electrolyte, comprising: at least one material selected from the group of materials consisting of compounds of formulae (I), (II), (III) and (IV):

(I)

wherein
y is a number from greater than 0 to less than 1, x is a value such that charge neutrality of the formula is obtained, and M1 is at least one element different from Li selected from elements of groups 1, 2 and 13;

(II)

wherein
z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and

(III)

wherein
h is from greater than 0 to less than 4, x is a value such that the formula (III) is charge neutral, and X is at least one element different from Cl selected from elements of groups 16 and 17; and

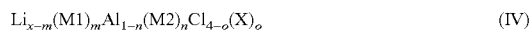
(IV)

wherein
m is a number from 0 to less than 1, n is a number from 0 to less than 1, o is a number from 0 to less than 4 and x is a value such that formula (IV) is charge neutral, with the proviso that at least two of m, n and o cannot be 0,
wherein the compounds of formulae (I), (II), (III) and (IV) comprise a crystal lattice structure having an orthorhombic phase of the space group Pnma, and
with the proviso that the content of M1, M2 and/or X is a value such that the Pnma structure of the compound is maintained.

Figure 2:
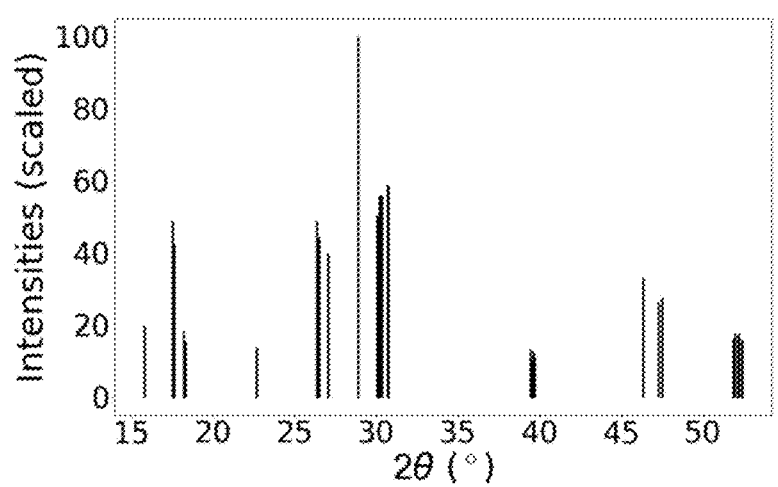
FIG. 2 shows the XRD analysis of the crystal structure of $LiAlCl_4$.

The compounds of formulae (I)-(IV) are derivative compounds of LiAlCl$_4$ having a crystal lattice structure of an orthorhombic phase of the space group Pnma. The crystal lattice structure of the LiAlCl$_4$ of the Pnma space group is depicted in FIG. 1 and a calculated X-ray diffraction (XRD) pattern based on Cu—Kα radiation with wavelength of 1.54184 Å for this space group is shown in FIG. 2. The peak positions and relative intensities are shown in FIG. 3.

The inventors have determined that substitution of elements M1 for Li, M2 for Al and X for Cl in the LiAlCl$_4$ of Pnma space group may enhance Li ion mobility and increase Li ion density within the crystal lattice to provide efficient Li ion conductors useful as solid electrolytes for lithium batteries.

The degree of doping or substitution that can be made in the LiAlCl$_4$ and still retain the Pnma morphology varies with the element being employed as dopant. Generally, the more similar in ionic radius and electronic structure the greater the mole amount of dopant that can be used without significant change of crystal morphology. The simulation methods applied and described herein may be employed to determine the degree of doping with a given element that can be made without changing the basic Pnma crystal structure.

For example, as described in the Examples Zn$^{2+}$ may be doped for Al$^{3+}$ to a ratio of 0.75 Zn/0.25 Al and the Pnma structure retained.

In further aspects of the first embodiment the simulation study has determined that the solid state electrolytes of formulae (I) to (IV) may have a lithium ion (Li$^+$) conductivity of from 0.01 to 10 mS/cm preferably 0.1 to 10 mS/cm at 300K.

Moreover, the activation energy of the solid state electrolytes of formulae (I) to (IV) may be from 0.2 to 0.45 eV.

Synthesis of the composite materials of the embodiments described above may be achieved by solid state reaction between stoichiometric amounts of selected precursor materials. Exemplary methods of solid state synthesis are described for example in each of the following papers: i) Monatshefte für Chemie, 100, 295-303, 1969; ii) Journal of Solid State Chemistry, 128, 1997, 241; iii) Zeitschrift für Naturforschung B, 50, 1995, 1061; iv) Journal of Solid State Chemistry 130, 1997, 90; v) Journal of Alloys and Compounds, 645, 2015, S174; and vi) Z. Naturforsch. 51b, 199652 5.

In further embodiments, the present application includes solid state lithium ion batteries containing the solid-state electrolytes described above. Solid-state batteries of these embodiments including metal-metal solid-state batteries may have higher charge/discharge rate capability and higher power density than classical batteries and may have the potential to provide high power and energy density.

Thus, in further embodiments, solid-state lithium batteries are provided. The solid state lithium battery comprises: an anode; a cathode; and a solid state lithium ion electrolyte located between the anode and the cathode; wherein the solid state lithium ion electrolyte comprises at least one material selected from the group of materials consisting compounds of formulae (I), (II), (III) and (IV):

$$Li_{x-y}(M1)_y AlCl_4 \qquad (I)$$

wherein y is a number from greater than 0 to less than 1, x is a value such that charge neutrality of the formula is obtained, and M1 is at least one element different from Li selected from elements of groups 1, 2 and 13;

$$Li_x Al_{1-z}(M2)_z Cl_4 \qquad (II)$$

wherein z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and $$Li_x AlCl_{4-h}(X)_h \qquad (III)$$

wherein h is from greater than 0 to less than 4, x is a value such that the formula (III) is charge neutral, and X is at least one element different from Cl selected from elements of groups 16 and 17; and $$Li_{x-m}(M1)_m Al_{1-n}(M2)_n Cl_{4-o}(X)_o \qquad (IV)$$

wherein m is a number from 0 to less than 1, n is a number from 0 to less than 1, o is a number from 0 to less than 4 and x is a value such that formula (IV) is charge neutral, with the proviso that at least two of m, n and o cannot be 0, wherein the compounds of formulae (I), (II), (III) and (IV) comprise a crystal lattice structure having an orthorhombic phase of the space group Pnma, and with the proviso that the content of M1, M2 and/or X is a value such that the Pnma structure of the compound is maintained.

The anode may be any anode structure conventionally employed in a lithium ion battery. Generally such materials are capable of insertion and extraction of Li+ ions. Example anode active materials may include graphite, hard carbon, lithium titanate (LTO), a tin/cobalt alloy and silicon/carbon composites. In one aspect the anode may comprise a current collector and a coating of a lithium ion active material on the current collector. Standard current collector materials include but are not limited to aluminum, copper, nickel, stainless steel, carbon, carbon paper and carbon cloth. In an aspect advantageously arranged with the solid-state lithium ion conductive materials described in the first and second embodiments, the anode may be lithium metal or a lithium metal alloy, optionally coated on a current collector. In one aspect, the anode may be a sheet of lithium metal serving both as active material and current collector.

The cathode structure may be any conventionally employed in lithium ion batteries, including but not limited to composite lithium metal oxides such as, for example, lithium cobalt oxide (LiCoO$_2$), lithium manganese oxide (LiMn$_2$O$_4$), lithium iron phosphate (LiFePO$_4$) and lithium nickel manganese cobalt oxide. Other active cathode materials may also include elemental sulfur and metal sulfide composites. The cathode may also include a current collector such as copper, aluminum and stainless steel.

In one aspect, the active cathode material may be a transition metal, preferably, silver or copper. A cathode based on such transition metal may not include a current collector.

In a further set of embodiments, electrodes containing the solid electrolyte materials of formulae (I)-(IV) are also disclosed. Thus in the preparation of the electrode the active material as described above may be physically mixed with the solid electrolyte material before application to the current collector or the solid electrolyte material may be applied as a coating layer on the applied active material. In either embodiment the presence of the lithium ion super conductor on or within the electrode structure may enhance performance of the electrode and especially when applied as a coating layer, may serve to protect a conventional solid state electrolyte.

Thus, an embodiment of the present disclosure includes a cathode comprising a current collector and a layer of cathode active material applied to the current collector wherein at least one of the following components is present: i) the cathode active material applied to the current collector is a physical mixture containing at least one of the solid electrolyte materials of formulae (I)-(IV) as described above; and ii) the layer of cathode active material applied to the current collector is coated with a layer comprising at least one of the solid electrolyte materials of formulae (I)-(IV). Cathodes having both elements i) and ii) are also included in the present disclosure.

In related embodiments the present disclosure includes an anode comprising a current collector and a layer of anode active material applied to the current collector wherein at least one of the following components is present: i) the anode active material applied to the current collector is a physical mixture containing at least one of the solid electrolyte materials of formulae (I)-(IV) as described above; and ii) the layer of anode active material applied to the current collector is coated with a layer comprising at least one of the solid electrolyte materials of formulae (I)-(IV).

Batteries containing a cathode as described in the above embodiment, an anode described in the above embodiment or containing both an anode and cathode according to the above embodiments are also embodiments of the present disclosure.

EXAMPLES

Figure 10:
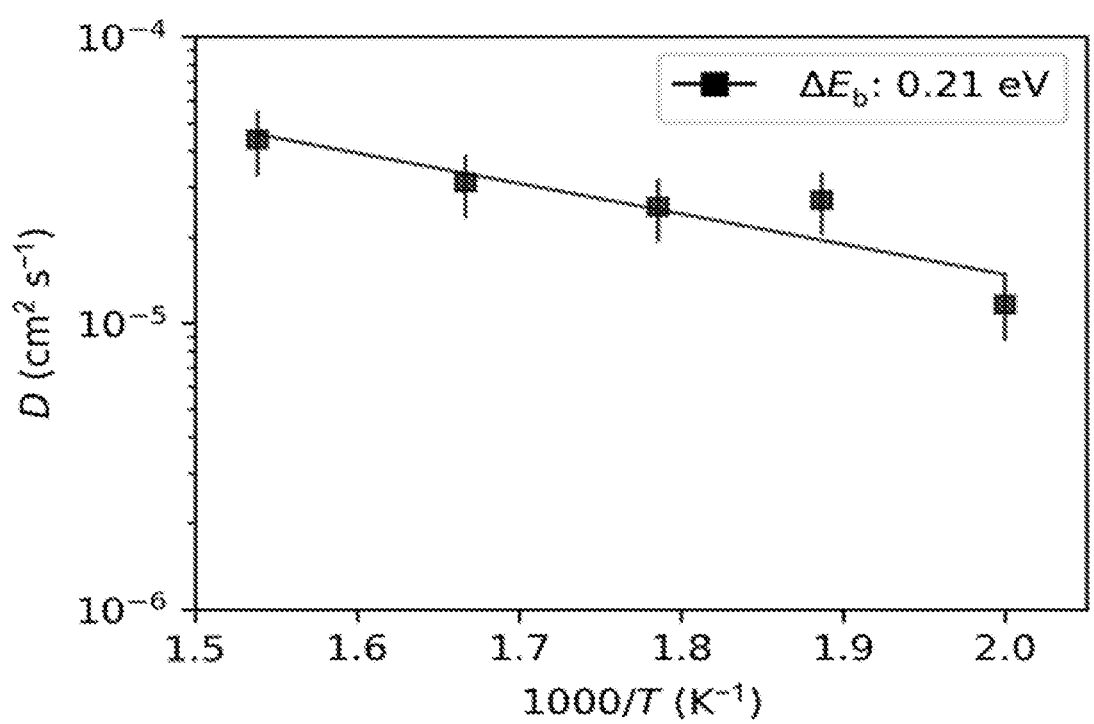
FIG. 10 shows an Arrhenius plot of Li-ion diffusivity D in $LiAlCl_4$ obtained from AIMD simulations.

Compounds of the formula $Li_{1.5}Zn_{0.5}Al_{0.5}Cl_4$ and c) $Li_{1.75}Zn_{0.75}Al_{0.25}Cl_4$ were studied employing the ab initio dynamics simulation to determine the conduction properties of these compounds and their derivatives. The initial structures were statically relaxed and were set to an initial temperature of 100 K. The structures were then heated to targeted temperatures (500-650 K) at a constant rate by velocity scaling over a time period of 2 ps. The total time of AIMD simulations were in the range of 400 to 1000 ps. The Li+ diffusivity at different temperatures from 500-650 K follows an Arrhenius-type relationship Both compounds are doped derivatives of LiAlCl$_4$ having an orthorhombic space group Pnma lattice structure. The crystal structure of LiAlCl$_4$ is shown in FIG. 1. FIG. 2 shows the XRD analysis of the crystal structure of LiAlCl$_4$ and FIG. 3 shows a table listing the peak positions and intensity for peaks of relative intensity of 1 or greater compared to the peak of greatest intensity in the XRD analysis of LiAlCl$_4$ in FIG. 2. FIG. 10 shows the Arrhenius plot of Li-ion diffusivity D with temperature for LiAlCl$_4$.

The activation energy of LiAlCl$_4$ is 0.21±0.06 eV, the Li-ion conductivity at 300 K of LiAlCl$_4$ is 36.7 mS cm$^{-1}$ with error bounds [2.6 mS cm$^{-1}$, 526.5 mS cm$^{-1}$], the energy above the hull E$_{hull}$ is 17 meV per atom, and the electrochemical window of LiAlCl$_4$ is 1.54 to 4.45 V referred to Li/Li+. The energy above the hull is the energy difference between the compound and its stable phase equilibria, which is conventionally used as a descriptor to justify the metastability and synthesizability of a compound. The E$_{hull}$ of LiAlCl4 (17 meV/atom) is lower than 30 meV/atom which implies experimental synthesizability (see A. H. Nolan, Y. Zhu, X. He, Q. Bai, Y. Mo, *Joule* 2018, 2 2016.)

Figure 4:
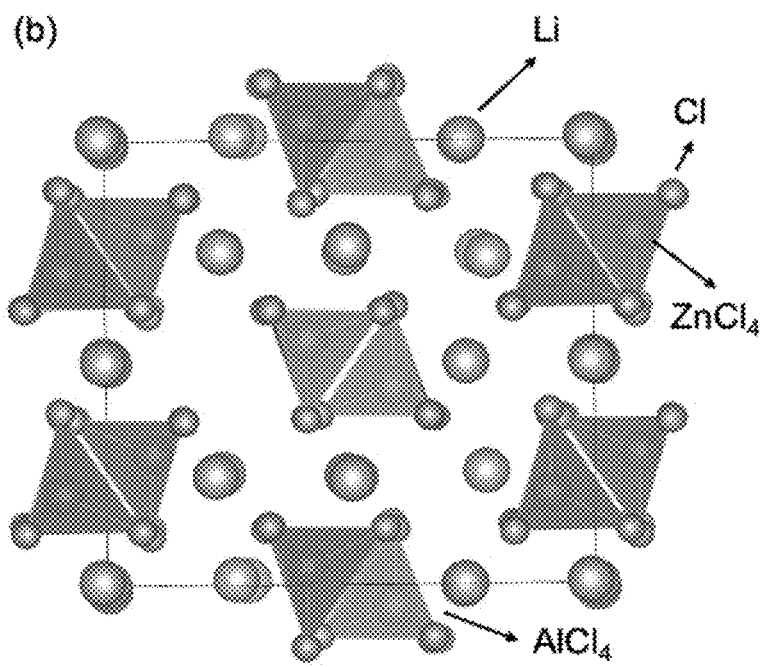
FIG. 4 shows the crystal structure of $Li_{1.5}Zn_{0.5}Al_{0.5}Cl_4$.
Figure 5:
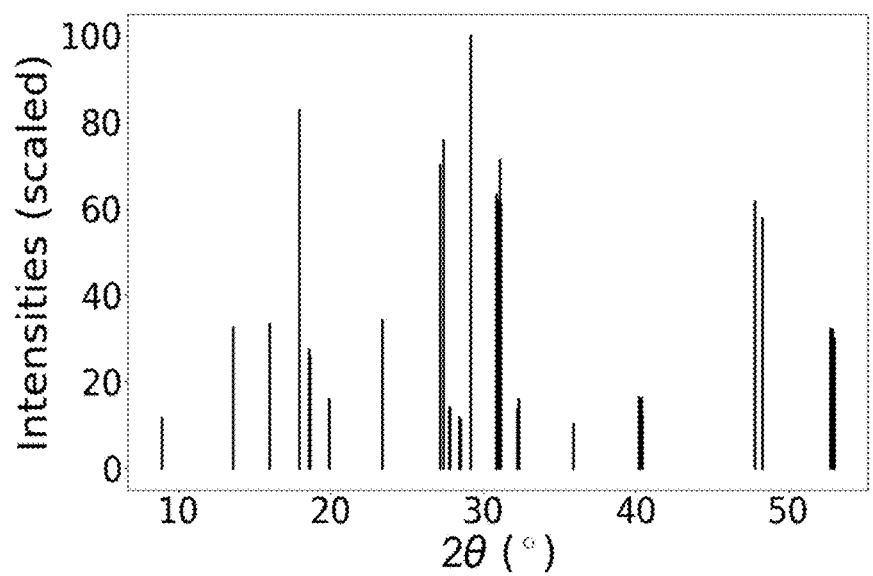
FIG. 5 shows the XRD analysis of the crystal structure of $Li_{1.5}Zn_{0.5}Al_{0.5}Cl_4$.

FIG. 4 shows the crystal structure of Li$_{1.5}$Zn$_{0.5}$Al$_{0.5}$Cl$_4$. FIG. 5 shows the XRD analysis of the crystal structure of Li$_{1.5}$Zn$_{0.5}$Al$_{0.5}$Cl$_4$ and FIG. 6 shows a table listing the peak positions and intensity for peaks of relative intensity of 1 or greater compared to the peak of greatest intensity in the XRD analysis of Li$_{1.5}$Zn$_{0.5}$Al$_{0.5}$Cl$_4$ in FIG. 5.

Figure 7:
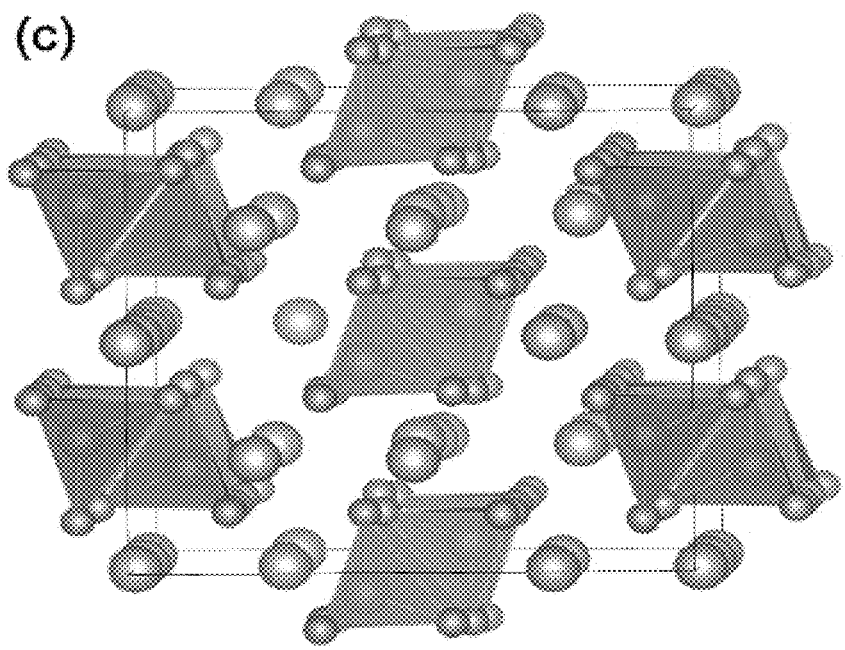
FIG. 7 shows the crystal structure of $Li_{1.75}Zn_{0.75}Al_{0.25}Cl_4$.
Figure 8:
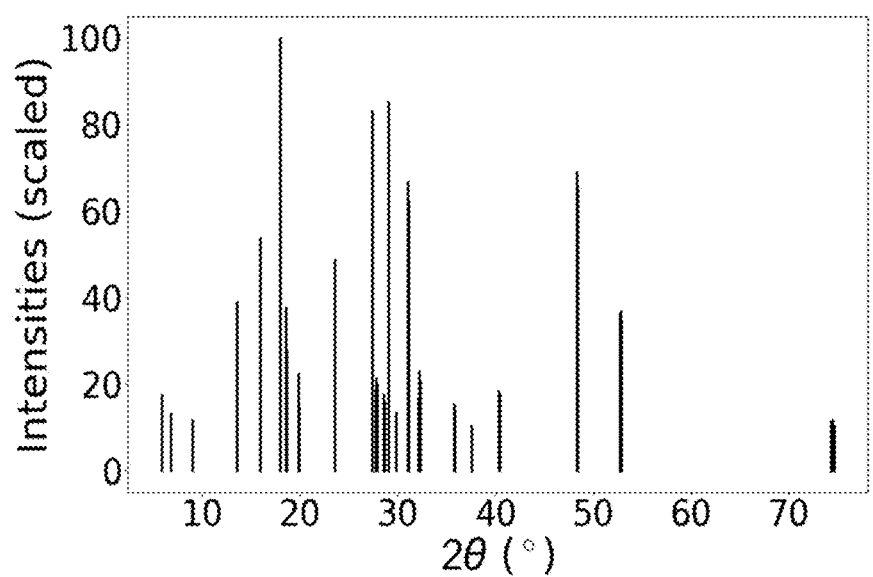
FIG. 8 shows the XRD analysis of the crystal structure of $Li_{1.75}Zn_{0.75}Al_{0.25}Cl_4$.

FIG. 7 shows the crystal structure of Li$_{1.75}$Zn$_{0.75}$Al$_{0.25}$Cl$_4$. FIG. 8 shows the XRD analysis of the crystal structure of Li$_{1.75}$Zn$_{0.75}$Al$_{0.25}$Cl$_4$ and FIG. 9 shows a table listing the peak positions and intensity for peaks of relative intensity of 1 or greater compared to the peak of greatest intensity in the XRD analysis of Li$_{1.75}$Zn$_{0.75}$Al$_{0.25}$Cl$_4$ in FIG. 8.

Figure 12:
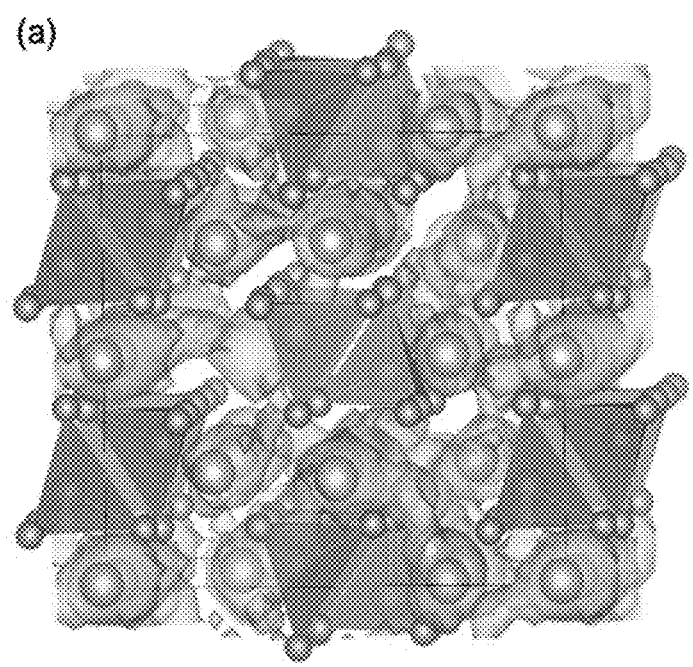
FIG. 12 shows the Li-ion probability density in $Li_{1.5}Zn_{0.5}Al_{0.5}Cl_4$ obtained from AIMD simulations.
Figure 13:
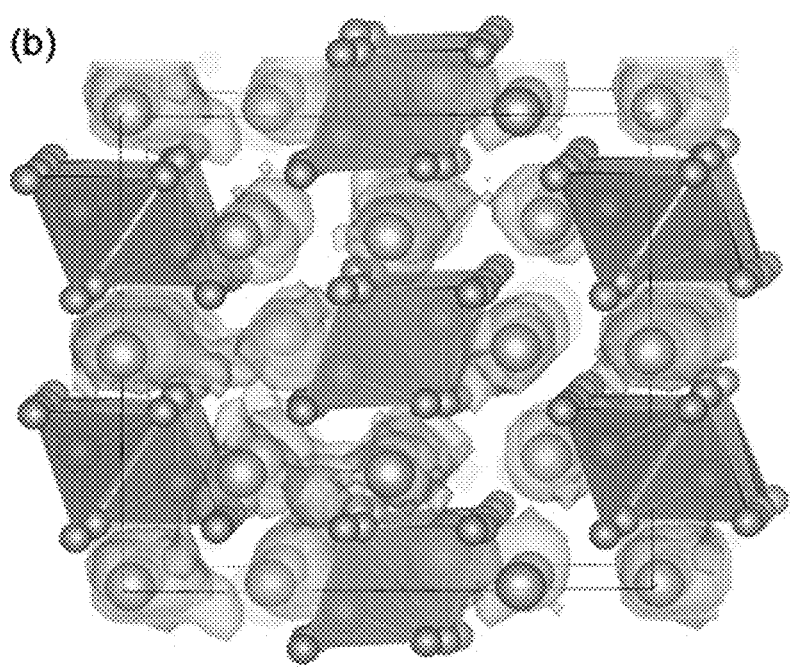
FIG. 13 shows the Li-ion probability density in $Li_{1.75}Zn_{0.75}Al_{0.25}Cl_4$ obtained from AIMD simulations.

FIGS. 11, 12 and 13 show the Li-ion probability density in LiAlCl$_4$, Li$_{1.5}$Zn$_{0.5}$Al$_{0.5}$Cl$_4$ and Li$_{1.75}$Zn$_{0.75}$Al$_{0.25}$Cl$_4$, respectively obtained from AIMD simulations. The Li-ion probability density extracted from AIMD simulations counts the fraction of Li-ion in each spatial location in the crystal structures. (see He. X, Zhu, y. and Mo, Y. Nat Commun 8, 15893 (2017)). The Li-ion probability densities in FIGS. 11, 12 and 13 show good channels for Li-ion conduction in the crystal structure. The high probability of Li-ion hopping for the Zn doped materials and the LiAlCl$_4$ demonstrates the advantageous lithium ion conductivity obtained with the compounds of formulae (I)-(IV).

Thus, these materials having the crystal morphology of the Pnma space group have the excellent properties necessary to function as a high Li-ion conductive solid electrolyte, a protective coating for an electrode or an active component of an electrode.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:
1. A solid-state lithium ion electrolyte, comprising:
at least one material selected from the group of materials consisting of compounds of formulae (I), (II), (III) and (IV):

$$Li_{x-y}(M1)_yAlCl_4 \qquad (I)$$

wherein
y is a number from greater than 0 to less than 1, x is a value such that charge neutrality of the formula is obtained, and M1 is at least one element different from Li selected from elements of groups 1, 2 and 13;

$$Li_xAl_{1-z}(M2)_zCl_4 \qquad (II)$$

wherein
z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and $$Li_xAlCl_{4-h}(X)_h \qquad (III)$$

wherein
h is from greater than 0 to less than 4, x is a value such that the formula (III) is charge neutral, and X is at least one element different from Cl selected from elements of groups 16 and 17; and $$Li_{x-m}(M1)_mAl_{1-n}(M2)_nCl_{4-o}(X)_o \qquad (IV)$$

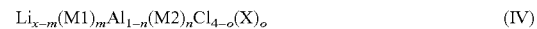

wherein
m is a number from 0 to less than 1, n is a number from 0 to less than 1, o is a number from 0 to less than 4 and x is a value such that formula (IV) is charge neutral, with the proviso that at least two of m, n and o cannot be 0,
wherein the compounds of formulae (I), (II), (III) and (IV) comprise a crystal lattice structure having an orthorhombic phase of the space group Pnma, and
with the proviso that the content of M1, M2 and/or X is a value such that the Pnma structure of the compound is maintained, and wherein a lithium ion (Li+) conductivity of the solid state lithium ion electrolyte is from 0.1 to 10 mS/cm at 300K.

2. The solid state lithium ion electrolyte according to claim 1, wherein
an activation energy of the material is from 0.2 to 0.45 eV.

3. The solid state electrolyte according to claim 1 wherein a calculated XRD analysis based on Cu—Kα radiation with wavelength of 1.54184 Å comprises the following peaks defining the Pnma space group:

| Peak Position | Relative Intensity |
|---|---|
| 15.8287 | 18.47 |
| 15.8412 | 19.40 |
| 17.5170 | 48.57 |
| 17.6141 | 41.81 |
| 18.2300 | 17.86 |
| 18.3236 | 15.33 |
| 22.6760 | 13.43 |
| 26.3747 | 48.78 |
| 26.5063 | 43.90 |
| 27.0275 | 39.54 |
| 28.8947 | 100.0 |
| 30.0765 | 50.07 |
| 30.2067 | 55.72 |
| 30.2070 | 50.77 |

-continued

| Peak Position | Relative Intensity |
| --- | --- |
| 30.3098 | 55.40 |
| 30.7076 | 58.42 |
| 30.7342 | 58.40 |
| 39.4155 | 12.77 |
| 39.5291 | 10.18 |
| 39.6216 | 12.25 |
| 39.6921 | 10.90 |
| 46.3067 | 32.52 |
| 47.2729 | 26.01 |
| 47.5117 | 27.20 |
| 51.8647 | 16.02 |
| 51.9651 | 17.17 |
| 52.1143 | 16.45 |
| 52.1627 | 17.26 |
| 52.3352 | 15.62 |
| 52.3867 | 15.41 |

4. A solid state lithium battery, comprising:
an anode;
a cathode; and
a solid state lithium ion electrolyte located between the anode and the cathode;
wherein
the solid state lithium ion electrolyte comprises at least one material selected from the group of materials consisting of compounds of formulae (I), (II), (III) and (IV):

$$Li_{x-y}(M1)_y AlCl_4 \quad (I)$$

wherein
y is a number from greater than 0 to less than 1, x is a value such that charge neutrality of the formula is obtained, and M1 is at least one element different from Li selected from elements of groups 1, 2 and 13;

$$Li_x Al_{1-z}(M2)_z Cl_4 \quad (II)$$

wherein
z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and $$Li_x AlCl_{4-h}(X)_h \quad (III)$$

wherein
h is from greater than 0 to less than 4, x is a value such that the formula (III) is charge neutral, and X is at least one element different from Cl selected from elements of groups 16 and 17; and $$Li_{x-m}(M1)_m Al_{1-n}(M2)_n Cl_{4-o}(X)_o \quad (IV)$$

wherein
m is a number from 0 to less than 1, n is a number from 0 to less than 1, o is a number from 0 to less than 4 and x is a value such that formula (IV) is charge neutral, with the proviso that at least two of m, n and o cannot be 0,
wherein the compounds of formulae (I), (II), (III) and (IV) comprise a crystal lattice structure having an orthorhombic phase of the space group Pnma, and
with the proviso that the content of M1, M2 and/or X is a value such that the Pnma structure of the compound is maintained, and wherein a lithium ion (Li+) conductivity of the solid state lithium ion electrolyte is from 0.1 to 10 mS/cm at 300K.

5. The solid state lithium ion battery according to claim 4, wherein the battery is a lithium metal battery or a lithium ion battery.

6. An electrode for a solid state lithium battery, comprising:
a current collector; and
an electrode active layer on the current collector;
wherein the electrode active layer comprises at least one compound selected from the group consisting of compounds of formulae (I), (II), (III) and (IV):

$$Li_{x-y}(M1)_y AlCl_4 \quad (I)$$

wherein
y is a number from greater than 0 to less than 1, x is a value such that charge neutrality of the formula is obtained, and M1 is at least one element different from Li selected from elements of groups 1, 2 and 13;

$$Li_x Al_{1-z}(M2)_z Cl_4 \quad (II)$$

wherein
z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and $$Li_x AlCl_{4-h}(X)_h \quad (III)$$

wherein
h is from greater than 0 to less than 4, x is a value such that the formula (III) is charge neutral, and X is at least one element different from Cl selected from elements of groups 16 and 17; and $$Li_{x-m}(M1)_m Al_{1-n}(M2)_n Cl_{4-o}(X)_o \quad (IV)$$

wherein
m is a number from 0 to less than 1, n is a number from 0 to less than 1, o is a number from 0 to less than 4 and x is a value such that formula (IV) is charge neutral, with the proviso that at least two of m, n and o cannot be 0,
wherein the compounds of formulae (I), (II), (III) and (IV) comprise a crystal lattice structure having an orthorhombic phase of the space group Pnma, and
with the proviso that the content of M1, M2 and/or X is a value such that the Pnma structure of the compound is maintained, and wherein a lithium ion (Li+) conductivity of the solid state lithium ion electrolyte is from 0.1 to 10 mS/cm at 300K.

7. An electrode for a solid state lithium battery, comprising:
a current collector;
an electrode active layer on the current collector; and a coating layer on the electrode active layer;
wherein the coating layer on the electrode active layer comprises at least one compound selected from the group consisting of formulae (I), (II), (III) and (IV);

$$Li_{x-y}(M1)_y AlCl_4 \quad (I)$$

wherein
y is a number from greater than 0 to less than 1, x is a value such that charge neutrality of the formula is obtained, and M1 is at least one element different from Li selected from elements of groups 1, 2 and 13;

$$Li_x Al_{1-z}(M2)_z Cl_4 \quad (II)$$

wherein
z is a number from greater than 0 to less than 1, x is a value such that the formula (II) is charge neutral, and M2 is at least one element different from Al selected from elements of groups 1, 2, 3, 4, 5, 6, 7, 8, 9, 10, 11, 12, 13, 14, 16 and 17; and $$Li_xAlCl_{4-h}(X)_h \quad (III)$$

wherein h is from greater than 0 to less than 4, x is a value such that the formula (III) is charge neutral, and X is at least one element different from Cl selected from elements of groups 16 and 17; and $$Li_{x-m}(M1)_m Al_{1-n}(M2)_n Cl_{4-o}(X)_o \quad (IV)$$

wherein m is a number from 0 to less than 1, n is a number from 0 to less than 1, o is a number from 0 to less than 4 and x is a value such that formula (IV) is charge neutral, with the proviso that at least two of m, n and o cannot be 0, wherein the compounds of formulae (I), (II), (III) and (IV) comprise a crystal lattice structure having an orthorhombic phase of the space group Pnma, and with the proviso that the content of M1, M2 and/or X is a value such that the Pnma structure of the compound is maintained, and wherein a lithium ion (Li+) conductivity of the solid state lithium ion electrolyte is from 0.1 to 10 mS/cm at 300K.

8. A solid state lithium battery comprising the electrode of claim 6, wherein the solid state lithium battery is a lithium ion battery or a lithium metal battery.

9. A solid state lithium battery comprising the electrode of claim 7, wherein the solid state lithium battery is a lithium ion battery or a lithium metal battery.

* * * * *